United States Patent
Ha et al.

(10) Patent No.: US 9,395,036 B2
(45) Date of Patent: Jul. 19, 2016

(54) BRACKET FOR A DISPLAY PANEL AND DISPLAY DEVICE INCLUDING THE SAME

(71) Applicant: Samsung Display Co., Ltd., Yongin, Gyeonggi-Do (KR)

(72) Inventors: Kuen-Dong Ha, Yongin (KR); Sang-Soo Kim, Yongin (KR); Jin-Min Jung, Yongin (KR); Soo-Yong Yoon, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 84 days.

(21) Appl. No.: 13/784,593

(22) Filed: Mar. 4, 2013

(65) Prior Publication Data

US 2013/0335892 A1 Dec. 19, 2013

(30) Foreign Application Priority Data

Jun. 13, 2012 (KR) .................. 10-2012-0063167
Jan. 29, 2013 (KR) .................. 10-2013-0009699

(51) Int. Cl.
| | |
|---|---|
| *G06F 1/16* | (2006.01) |
| *H05K 5/00* | (2006.01) |
| *H05K 7/00* | (2006.01) |
| *F16M 13/00* | (2006.01) |
| *F16M 11/04* | (2006.01) |
| *F16M 11/22* | (2006.01) |
| *H04N 5/64* | (2006.01) |

(52) U.S. Cl.
CPC .............. *F16M 13/00* (2013.01); *F16M 11/04* (2013.01); *F16M 11/22* (2013.01); *G06F 1/1637* (2013.01); *H05K 5/0017* (2013.01); *H04N 5/64* (2013.01)

(58) Field of Classification Search
CPC ........................... G06F 1/1601; G06F 1/1613
USPC ...................... 361/679.21–679.3; 349/56–60
See application file for complete search history.

(56) References Cited

U.S. PATENT DOCUMENTS

| | | | | |
|---|---|---|---|---|
| 5,606,341 A | * | 2/1997 | Aguilera | F28D 15/0266 345/87 |
| 5,666,261 A | * | 9/1997 | Aguilera | 361/679.09 |
| 6,532,152 B1 | * | 3/2003 | White et al. | 361/692 |
| 7,342,792 B2 | * | 3/2008 | Kim et al. | 361/704 |
| 7,675,234 B2 | | 3/2010 | Fu et al. | |
| 8,654,517 B2 | * | 2/2014 | Aumiller | G06F 1/1637 108/50.01 |
| 2009/0135331 A1 | * | 5/2009 | Kawase | 349/58 |
| 2010/0013742 A1 | | 1/2010 | Unger | |
| 2010/0321870 A1 | | 12/2010 | Hirai et al. | |
| 2011/0141694 A1 | | 6/2011 | Kamiguchi | |

FOREIGN PATENT DOCUMENTS

JP 2008-276035 A 11/2008

OTHER PUBLICATIONS

Extended European Search Report for corresponding EP Application No. 13171026.1, completed Jun. 13, 2016 (3 pages).

* cited by examiner

*Primary Examiner* — Anthony Haughton

(74) *Attorney, Agent, or Firm* — Lewis Roca Rothgerber Christie LLP

(57) ABSTRACT

A bracket for a display panel, the bracket including a first plate for contacting the display panel, a second plate facing the first plate and having an area smaller than that of the first plate, and partitions between the first plate and the second plate.

20 Claims, 8 Drawing Sheets

BRACKET FOR A DISPLAY PANEL AND DISPLAY DEVICE INCLUDING THE SAME

CROSS REFERENCE TO RELATED APPLICATION

This application claims priority to and the benefit of Korean patent Application Nos. 10-2012-0063167, filed on Jun. 13, 2012 and 10-2013-0009699, filed on Jan. 29, 2013 the disclosure of which is hereby incorporated by reference herein in its entirety.

BACKGROUND

1. Technical Field

Exemplary embodiments of the present invention relate to a bracket for a display panel and a display device including the bracket.

2. Description of Related Art

Generally, a display panel of a television, a notebook, etc., may be supported by a bracket.

SUMMARY

Exemplary embodiments of the present invention provide a bracket for a display panel that may be capable of firmly supporting the relatively heavy display panel and preventing, or improving the quality of, a poor display quality, and may also have a relatively light, thin structure.

Exemplary embodiments of the present invention also provide a display device including the above-mentioned bracket.

According to one aspect of exemplary embodiments, there is provided a bracket for a display panel, the bracket including a first plate for contacting the display panel, a second plate facing the first plate and having an area smaller than that of the first plate, and partitions between the first plate and the second plate.

The first plate may have an edge surface extending beyond an edge of the second plate.

The bracket may further include an outer plate on the edge surface of the first plate and coupled to the display panel.

A thickness of the outer plate may be less than or equal to a distance from the edge surface of the first plate to an outer surface of the second plate.

The outer plate, the first plate, the second plate, and the partitions may include a substantially similar material.

The outer plate, the first plate, the second plate, and the partitions may include aluminum.

The partitions may include a honeycomb-like structure.

The partitions may include a wave-like structure.

The second plate may include a bent portion extended from an edge of the second plate toward the first plate and configured to make contact with the first plate.

The display panel may include an organic light emitting display (OLED) panel.

According to one aspect of exemplary embodiments, there is provided a bracket for a display panel including a display region and a non-display region. The bracket may include a first plate contacting the display panel, a second plate facing the first plate and having an area smaller than that of the first plate to expose an edge portion of the first plate, the edge portion corresponding to the non-display region of the display panel, and partitions between the first plate and the second plate.

The area of the second plate may be substantially the same as that of the display region of the display panel.

The bracket may further include an outer plate on the edge portion of the first plate to be coupled to the display panel.

A thickness of the outer plate may be less than or equal to a distance from the edge portion of the first plate to an outer surface of the second plate.

The outer plate may contact the first plate at an area corresponding to the non-display region of the display panel.

The partitions may include a honeycomb-like structure.

The partitions may have a wave-like structure.

The second plate may include a bent portion extended from an edge of the second plate toward the first plate and configured to make contact with the first plate.

According to one aspect of exemplary embodiments, there is provided a display device. The display device may include a display panel and a bracket. The bracket may include a first plate for contacting the display panel, a second plate facing the first plate and having an area smaller than that of the first plate, and partitions between the first plate and the second plate.

The display panel may include an organic light emitting display (OLED) panel.

According to exemplary embodiments, the second plate may have an area smaller than that of the first plate, so that the edge portion of the first plate, which corresponds to the non-display region of the display panel may be exposed by the second plate. Particularly, the thickness of the outer plate might be less than or equal to the distance from the exposed surface of the first plate to the outer surface of the second plate. Thus, the thickness of the outer plate might not add to a total thickness of the bracket, so that the bracket may have relatively thin thickness and light weight. Further, because the outer plate may be located on the first plate edge portion corresponding to the non-display region of the display panel, the outer plate might not decrease a display quality of the display panel.

BRIEF DESCRIPTION OF THE DRAWINGS

Exemplary embodiments can be understood in more detail from the following description taken in conjunction with the accompanying drawings, in which.

DETAILED DESCRIPTION

Figure 1:
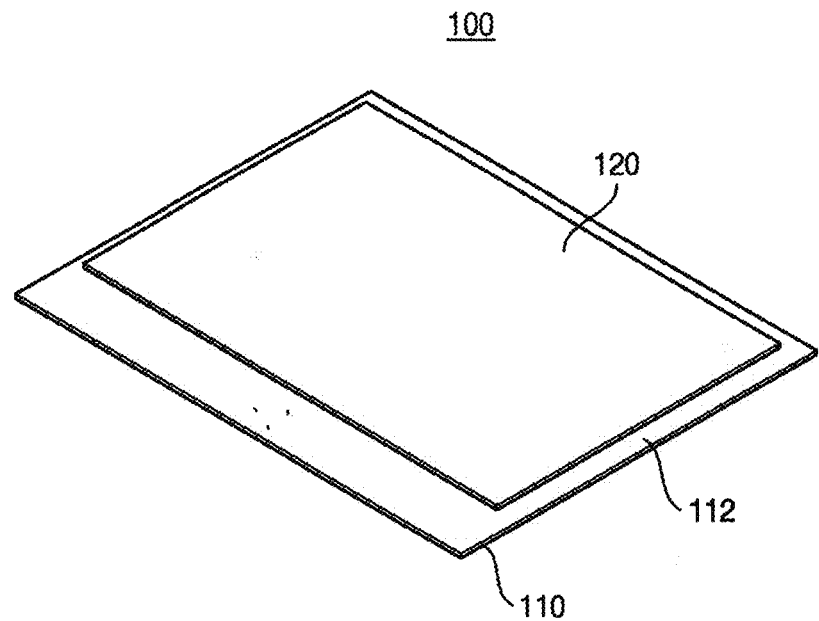
FIG. 1 is a perspective view illustrating a bracket for a display panel in accordance with exemplary embodiments of the present invention.

The exemplary embodiments are described more fully hereinafter with reference to the accompanying drawings. The inventive concept may, however, be embodied in many different forms, and should not be construed as limited to the exemplary embodiments set forth herein. In the drawings, the sizes and relative sizes of layers and regions may be exaggerated for clarity.

It will be understood that when an element or layer is referred to as being "on," "connected to," or "coupled to" another element or layer, it can be directly on, connected to, or coupled to the other element or layer, or intervening elements or layers may be present. In contrast, when an element is referred to as being "directly on," "directly connected to," or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns, and/or sections, these elements, components, regions, layers, patterns, and/or sections should not be limited by these terms. These terms are only used to distinguish one element, component, region, layer pattern, or section from another region, layer, pattern, or section. Thus, a first element, component, region, layer, or section discussed below could be termed a second element, component, region, layer, or section without departing from the teachings of exemplary embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

The terminology used herein is for the purpose of describing particular exemplary embodiments only, and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to the FIGS., which include cross sectional illustrations that are schematic illustrations of illustratively idealized exemplary embodiments (and intermediate structures) of the inventive concept. As such, variations from the shapes of the illustrations as a result of, for example, manufacturing techniques and/or tolerances are to be expected. Thus, exemplary embodiments should not be construed as limited to the particular shapes of regions illustrated herein, but are to include deviations in shapes that result, for example, from manufacturing. The regions illustrated in the figures are schematic in nature, and their shapes are not intended to illustrate the actual shape of a region of a device, and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

As customers may desire a lighter display panel, the weight of the bracket may be reduced. However, the relatively light bracket may require a structure for firmly supporting the relatively heavy display panel. Further, it may be useful to provide the bracket with a structure that might not cause a poor display quality of an image in a display region of the display panel.

Recently, as the thickness of the display panel may have been reduced, it may be useful to develop a thin bracket having the above-mentioned requirements.

Figure 2:
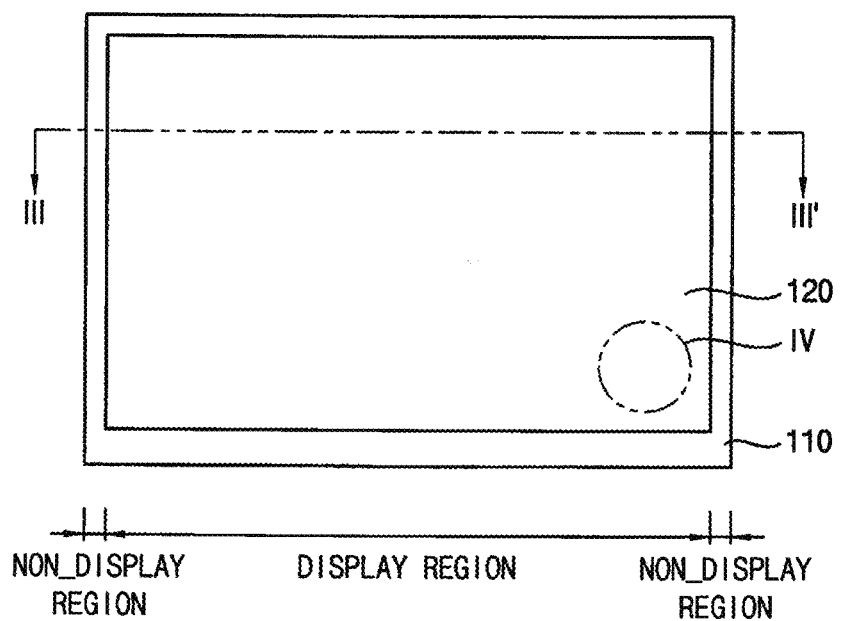
FIG. 2 is a plan view illustrating the bracket of the embodiment shown in FIG. 1.
Figure 3:
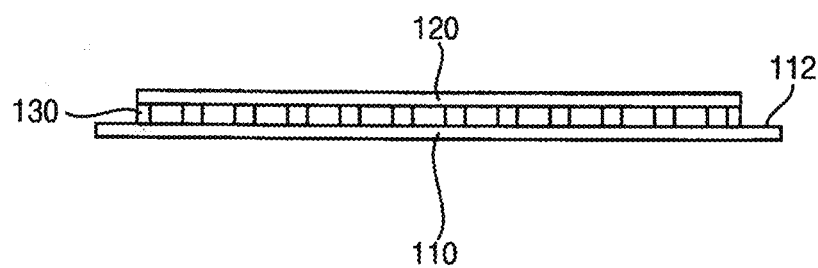
FIG. 3 is a cross-sectional view taken along the line in FIG. 2.
Figure 4:
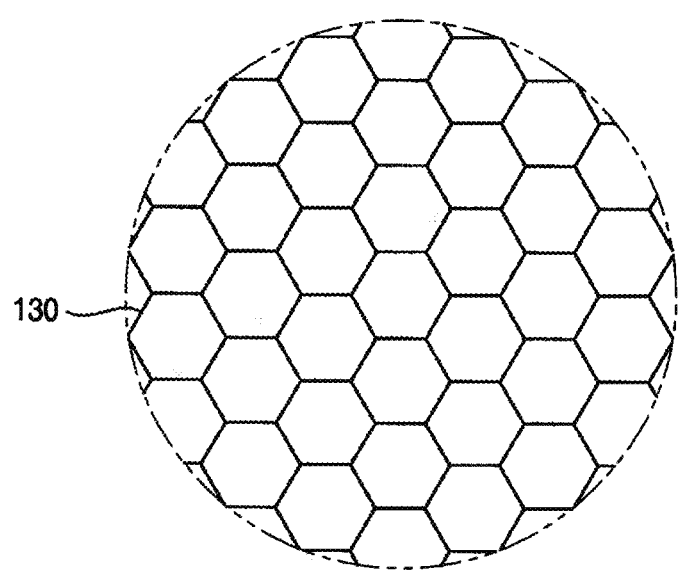
FIG. 4 is an enlarged plan view illustrating an inner structure of the portion IV in FIG. 2.

FIG. 1 is a perspective view illustrating a bracket for a display panel in accordance with exemplary embodiments, FIG. 2 is a plan view illustrating the bracket of the embodiment shown in FIG. 1, FIG. 3 is a cross-sectional view taken along the line in FIG. 2, FIG. 4 is an enlarged plan view illustrating an inner structure of a portion IV in FIG. 2.

Referring to FIGS. 1 to 4, a bracket 100 for a display panel D (see FIG. 6) in accordance with the present exemplary embodiment may include a first plate 110, a second plate 120 and partitions 130. In the present embodiment, the display panel D may have a display region and a non-display region. The display region may correspond to a central portion of the display panel D, and the non-display region may correspond to an edge portion of the display panel D. The display panel D may include an organic light emitting display (OLED) panel, a liquid crystal display (LCD) panel, a plasma display panel, etc.

In the present embodiment, the first plate 110 may have a rectangular shape, and may make contact with the display panel D to support the display panel D.

The second plate 120 may be located above the first plate 110, and may thus face the first plate 110. In the present embodiment, the second plate 120 may have a rectangular shape.

The partitions 130 may be between the first plate 110 and the second plate 120, and may each have a lower end coupled to an upper surface of the first plate 110, and an upper end coupled to a lower surface of the second plate 120. As shown in FIG. 4, the partitions 130 may divide a space between the first plate 110 and the second plate 120 into a honeycomb-like structure.

The honeycomb-shaped partitions 130 may be relatively strong, and may suppress heat transfer, such as heat generated from the display panel D, along a first direction from the first plate 110 to the second plate 120. In contrast, the honeycomb-shaped partitions 130 may disperse the heat along a second direction substantially perpendicular to the first direction. As a result, the heat generated from the display panel D may be rapidly dissipated to the outside through the honeycomb-shaped partitions 130.

In the present embodiment, the first plate 110, the second plate 120, and the partitions 130 may include substantially the same material, for example, a metal such as aluminum. Because the first plate 110, the second plate 120, and the partitions 130 may have the same material, the bracket 100 may have a substantially continuous structure. As a result, a discontinuous line might be avoided in a temperature distribution of the display panel D.

In the present embodiment, the second plate 120 may have an area smaller than that of the first plate 110. Thus, the first plate 110 may have an edge portion 112 uncovered by the second plate 120. That is, the edge portion 112 of the first plate 110 may extend beyond a perimeter of, and may thus be exposed by, the second plate 120. As a result, a space may be formed over the edge portion of the first plate 110. An outer plate 140 (see FIG. 6) may be located in the space over the edge portion of the first plate 110. The edge portion 112 of the first plate 110 may correspond to the non-display region of the display panel D. Therefore, the second plate 120 may have an area substantially the same as that of the display region of the display panel D.

Alternatively, an edge portion of a preliminary second plate (e.g., a precursor to the second plate 120) having an area substantially the same as that of the first plate 110 may be removed by a press process to form the second plate 120 having the area smaller than that of the first plate 110. Because the honeycomb bracket 100 may have a very low volume ratio (e.g., density), the edge portion of the preliminary second plate may be readily pressed.

Figure 5:
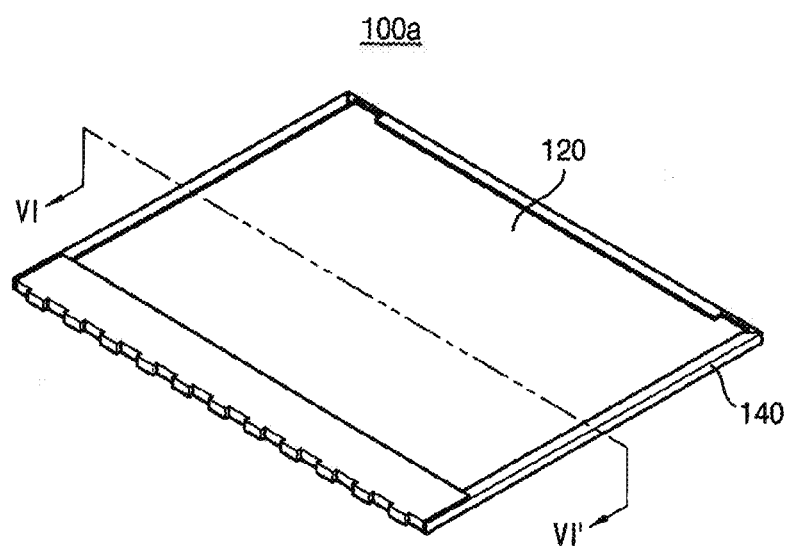
FIG. 5 is a perspective view illustrating an outer plate assembled with the bracket of the embodiment shown in FIG. 1.
Figure 6:
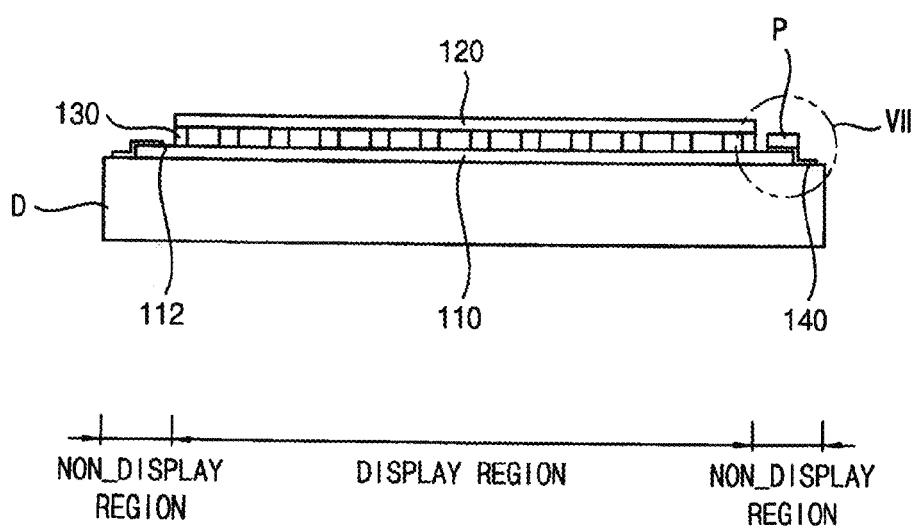
FIG. 6 is a cross-sectional view taken along the line VI-VI' in FIG. 5.
Figure 7:
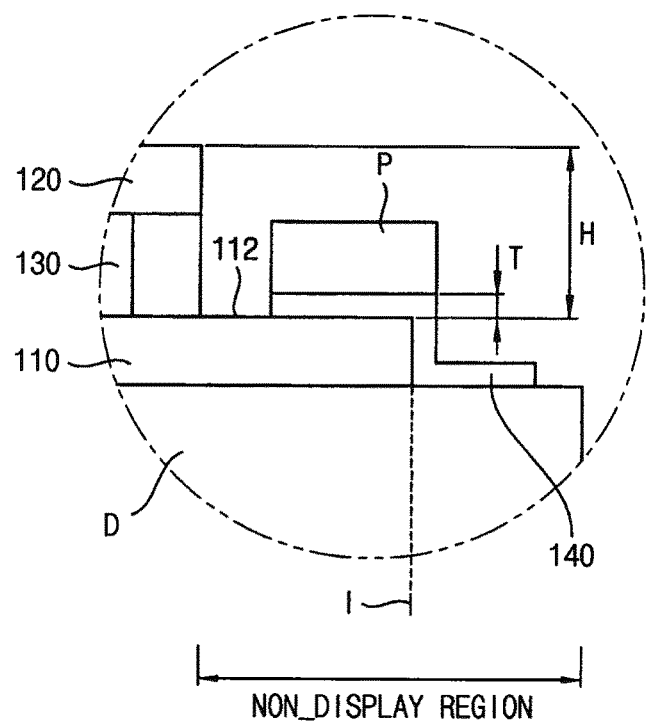
FIG. 7 is an enlarged cross-sectional view illustrating the portion VIII in FIG. 6.
Figure 8:
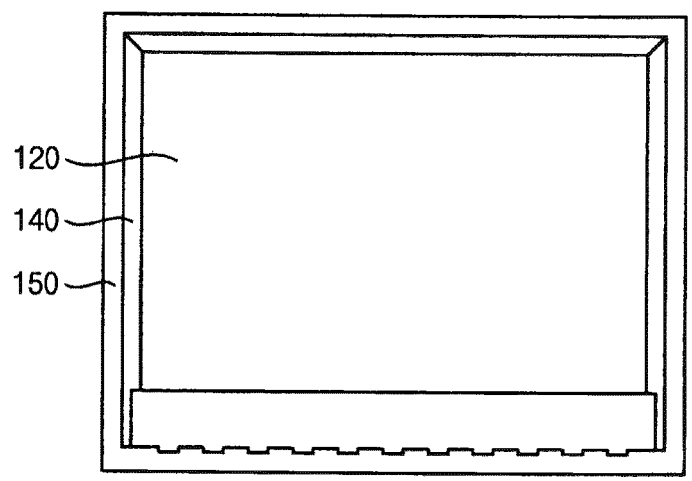
FIG. 8 is a plan view illustrating a decorative frame assembled with the bracket of the embodiment shown in FIG. 5.

FIG. 5 is a perspective view illustrating an outer plate assembled with the bracket of the embodiment shown in FIG. 1, FIG. 6 is a cross-sectional view taken along the line VI-VI' in FIG. 5, FIG. 7 is an enlarged cross-sectional view illustrating a portion VIII in FIG. 6, and FIG. 8 is a plan view illustrating a decorative frame assembled with the bracket of the embodiment shown in FIG. 5.

Referring to FIGS. 5 to 7, a bracket 100a of this embodiment may further include an outer plate 140. The outer plate 140 may be combined with the bracket 100, and may include four plates arranged on four sides of the bracket 100.

In exemplary embodiments, the outer plate 140 may be attached to the bracket 100a using a double-sided adhesive tape, an adhesive, etc. Alternatively, the outer plate 140 may be secured to a jig (not shown). The pressed edge portions of the bracket 100a may be assembled with the outer plate 140. Because the outer plate 140 may be positioned, a process for pressing and cutting the edge portion of the second plate 120 may have a sufficiently wide clearance.

In the present embodiment, the outer plate 140 may be located on the exposed surface of the first plate 110, i.e., the edge portion of the first plate 110, which may correspond to the non-display region of the display panel D. Thus, the outer plate 140 may also be positioned in, or correspond to, the non-display region of the display panel D. As a result, a display quality of the display panel D might not be deteriorated due to the outer plate 140. Particularly, a main factor for deteriorating the display quality of the display panel D may be a boundary line I between the outer plate 140 and the first plate 110. The boundary line I (see FIG. 7) may be located in the non-display region of the display panel D. Therefore, the boundary line I between the outer plate 140 and the first plate 110 might not deteriorate the display quality of the display panel D.

In the present embodiment, the outer plate 140 may include a material substantially the same as that of the first plate 110, the second plate 120, and the partitions 130, for example, a metal such as aluminum. Thus, because the outer plate 140 may include the material substantially the same as that of the bracket 100a, the outer plate 140 might have no influence on the display quality of the display panel D.

In the present embodiment, the outer plate 140 may have a thickness T substantially equal to or less than a distance H from an inner surface of the first plate 110 to an outer surface of the second plate 120 (see FIG. 7). Here, the inner surface of the first plate 110 may be oriented toward the second plate 120, and the outer surface of the second plate 120 may be oriented opposite to, or away from, the first plate 110. That is, the thickness T of the outer plate 140 may be less than the distance H between the inner surface of the first plate 110 and the outer surface of the second plate 120. Thus, the outer plate 140 on the edge portion of the first plate 110 might not protrude from the outer surface of the second plate 120. As a result, the thickness T of the outer plate 140 might not add to a total thickness of the bracket 100a. That is, the total thickness of the bracket 100a may correspond to a distance between an outer surface of the first plate 110 and the outer surface of the second plate 120. Because the total thickness of the bracket 100a might not include the thickness T of the outer plate 140, the honeycomb bracket 100a having relatively thin thickness may firmly support the relatively heavy display panel D.

A printed circuit board (PCB) P may be arranged on the outer plate 140, and may supply electrical signals to the display panel D.

Referring to FIG. 8, a decorative frame 150 may be installed at the outer plate 140. The decorative frame 150 may be positioned in the non-display region of the display panel D. Thus, the decorative frame 150 might not deteriorate the display quality of the display panel D.

Figure 9:
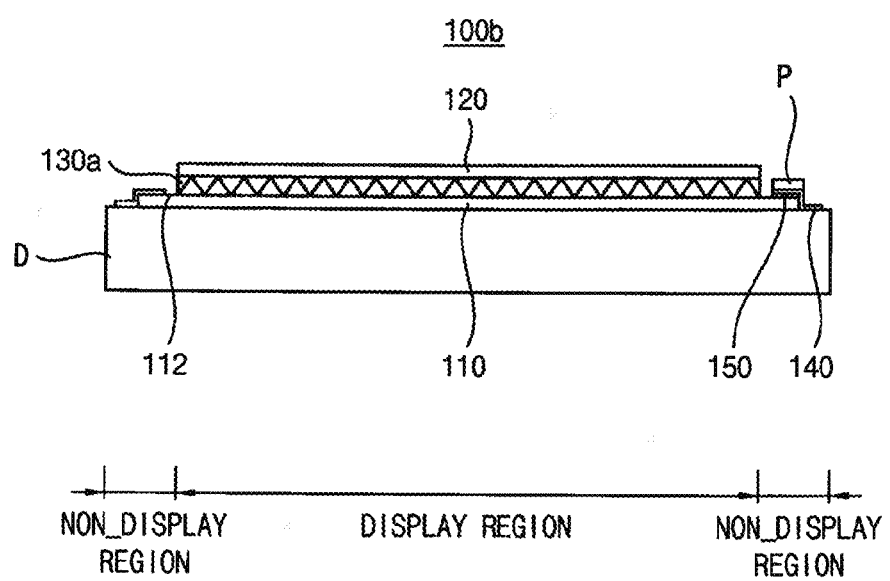
FIG. 9 is a cross-sectional view illustrating a bracket for a display panel in accordance with exemplary embodiments.

FIG. 9 is a cross-sectional view illustrating a bracket for a display panel in accordance with exemplary embodiments.

A bracket 100b of the present embodiment may include elements substantially the same as those of the bracket 100 of the embodiment shown in FIG. 6, although there may be differences in a shape of partitions. Thus, the same reference numerals may refer to the same elements and any further illustrations with respect to the same element may be omitted herein for brevity.

Referring to FIG. 9, the partitions 130a of the bracket 100b may have a wave-like shape. The wave-like partitions 130a may have lowermost ends fixed to the first plate 110, and uppermost ends fixed to the second plate 120. The bracket 100a having the wave-like partitions 130a may be shaped similarly to a corrugated cardboard.

In exemplary embodiments, the outer plate 140 may be coupled with the first plate 110 via a thermal conductive tape 150.

The bracket 100a having the wave-like partitions 130a may be manufactured by processes relatively simpler than those for manufacturing the bracket 100 having the honeycomb-shaped partitions 130.

Figure 10:
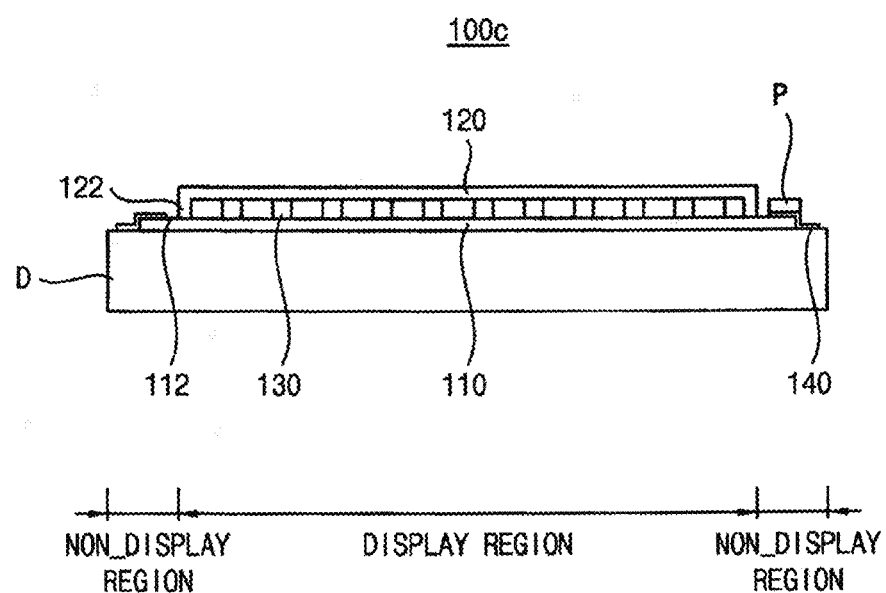
FIG. 10 is a cross-sectional view illustrating a bracket for a display panel in accordance with exemplary embodiments.

FIG. 10 is a cross-sectional view illustrating a bracket for a display panel in accordance with exemplary embodiments.

A bracket 100c of the present embodiment may include elements substantially the same as those of the bracket 100 of the embodiment shown in FIG. 6, although there may be differences in a second plate. Thus, the same reference numerals may refer to the same elements and any further illustrations with respect to the same element may be omitted herein for brevity.

Referring to FIG. 10, a second plate 120 of this embodiment may have a bent portion 122. The bent portion 122 may be vertically bent from an edge of the second plate 120 toward the first plate 110. The bent portion 122 may make contact with the upper surface of the first plate.

The brackets 100, 100a, 100b and 100c of the embodiments may be included in a display device. Thus, the display device may include any one of the brackets 100, 100a, 100b and 100c, and the display panel D.

Measuring Thermal Distribution of a Display Panel

Figure 11:
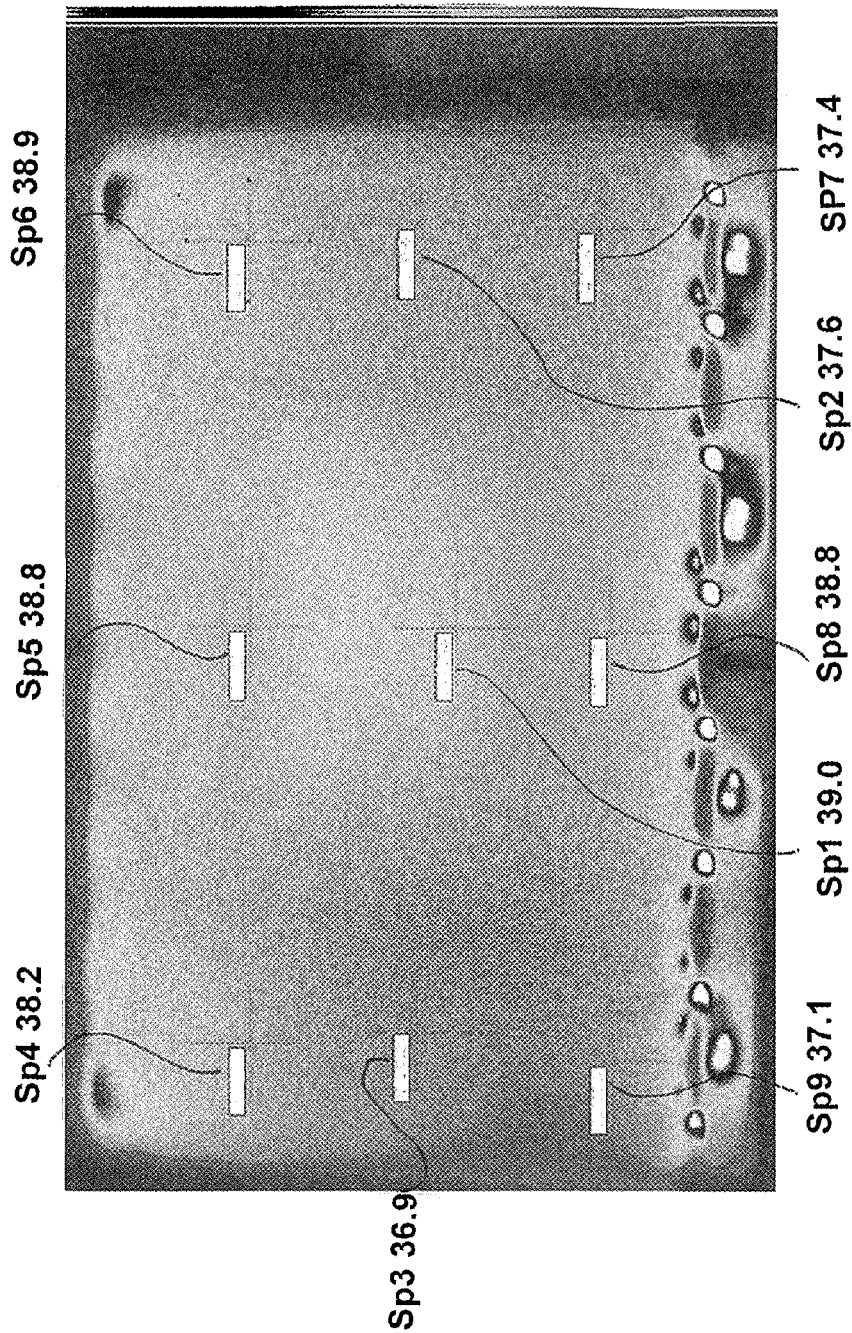
FIG. 11 is a picture illustrating a thermal distribution of a display panel supported by the bracket of the embodiment shown in FIG. 5.

A thermal distribution of the display panel supported by the bracket of the embodiment shown in FIG. 5 is shown in FIG. 11. As shown in FIG. 11, heat may be uniformly distributed on the display region of the display panel. Thus, the honeycomb bracket may substantially uniformly distribute the heat generated from the display panel.

Measuring Temperatures of a Display Panel

Figure 12:
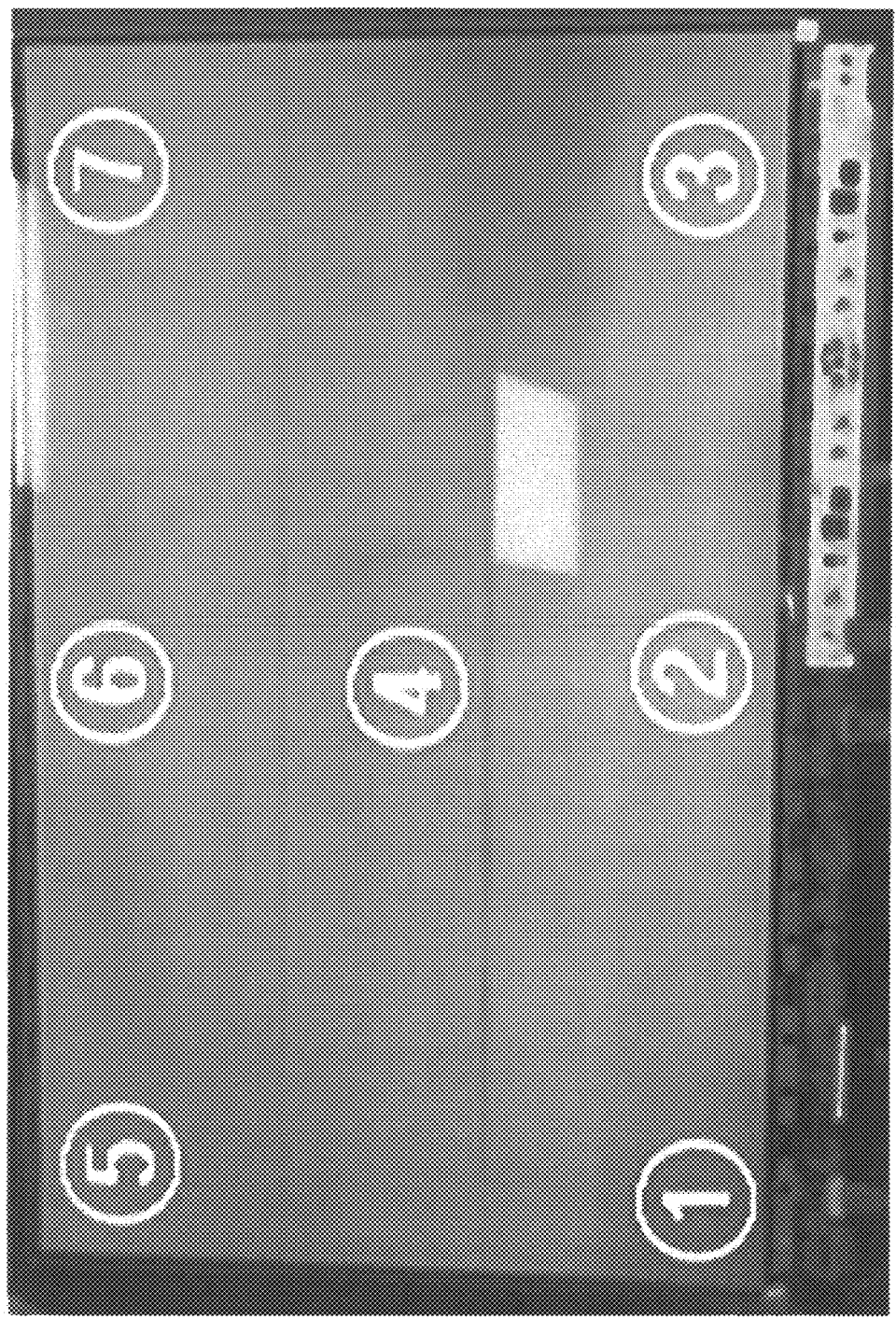
FIG. 12 is a picture illustrating temperature measurement points of the display panel supported by the bracket of the embodiment shown in FIG. 5.

Temperatures of a first display panel supported by a bracket without a receiving space of the outer plate were measured. Temperatures of a second display panel supported by the bracket of the embodiment shown in FIG. 6 with a receiving space of the outer plate were measured. As shown in FIG. 12, the measured temperatures of each of seven points on the first display panel and the second display panel are shown in following table.

TABLE

| Measured Point | First Display Panel | Second Display Panel |
| --- | --- | --- |
| 1 | 36.8 | 37.6 |
| 2 | 38.5 | 38.8 |
| 3 | 36.8 | 37.4 |
| 4 | 31.9 | 39.0 |
| 5 | 34.1 | 38.2 |
| 6 | 35.4 | 38.8 |
| 7 | 30.9 | 38.9 |
| Maximum Temperature | 41.4 | 39.0 |
| Minimum Temperature | 30.9 | 37.4 |
| Temperature Difference | 10.5 | 1.6 |

As shown in Table, the first display panel supported by the bracket without the receiving space of the outer plate may have a relatively large temperature difference of 10.5° C. (e.g., the difference between the maximum temperature and the minimum temperature). However, the second display panel supported by the bracket of this exemplary embodiment with the receiving space of the outer plate may have a relatively small temperature difference of 1.6° C. Thus, the second display panel supported by the honeycomb bracket may have more relatively uniform temperature distribution.

According to exemplary embodiments, the second plate may have a smaller area than the first plate, so that the edge portion of the first plate corresponding to the non-display region of the display panel may be exposed by the second plate. More specifically, the thickness of the outer plate may be less than or equal to the distance from the exposed surface of the first plate to the outer surface of the second plate. Thus, the thickness of the outer plate might not be added to a total thickness of the bracket, so that the bracket may have a relatively thin thickness and a relatively light weight. Further, because the outer plate may be located on the edge portion of the first plate corresponding to the non-display region of the display panel, the outer plate might not decrease a display quality of the display panel.

The foregoing is illustrative of exemplary embodiments, and is not to be construed as limiting thereof. Although a few exemplary embodiments have been described, those skilled in the art will readily appreciate that many modifications are possible in the exemplary embodiments without materially departing from the novel teachings and advantages of exemplary embodiments. Accordingly, all such modifications are intended to be included within the scope of exemplary embodiments as defined in the claims. In the claims, means-plus-function clauses are intended to cover the structures described herein as performing the recited function and not only structural equivalents but also equivalent structures. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

What is claimed is:

1. A bracket for a display panel, the bracket comprising:
a first plate for contacting the display panel, wherein a first surface of the first plate is configured to face the display panel;
a second plate facing a second surface of the first plate opposite the first surface of the first plate, wherein the second plate has an area corresponding to a region of the display panel that is smaller than an area of the first plate; and
partitions between the first plate and the second plate,
wherein the first plate has an edge surface extending beyond an outermost edge of the second plate.

2. The bracket of claim 1, further comprising an outer plate on the edge surface of the first plate and coupled to the display panel.

3. The bracket of claim 2, wherein a thickness of the outer plate is less than or equal to a distance from the edge surface of the first plate to an outer surface of the second plate.

4. The bracket of claim 2, wherein the outer plate, the first plate, the second plate, and the partitions comprise a substantially similar material.

5. The bracket of claim 4, wherein the outer plate, the first plate, the second plate, and the partitions comprise aluminum.

6. The bracket of claim 1, wherein the partitions comprise a honeycomb-like structure.

7. The bracket of claim 1, wherein the partitions comprise a wave-like structure.

8. The bracket of claim 1, wherein the second plate has a bent portion extended from an edge of the second plate toward the first plate and configured to make contact with the first plate.

9. The bracket of claim 1, wherein the display panel comprises an organic light emitting display (OLED) panel.

10. The bracket of claim 1, wherein a width or a length of the second plate is less than a corresponding width or length of the first plate.

11. A bracket for a display panel comprising a display region and a non-display region, the bracket comprising:
a first plate contacting the display panel, wherein a first surface of the first plate is facing the display panel;
a second plate facing a second surface of the first plate opposite the first surface of the first plate, wherein the second plate has an area corresponding to the display region of the display panel that is smaller than an area of the first plate to expose an edge portion of the first plate, the edge portion corresponding to the non-display region of the display panel; and partitions between the first plate and the second plate, wherein the first plate has an edge surface extending beyond an outermost edge of the second plate.

12. The bracket of claim 11, wherein the area of the second plate is substantially the same as that of the display region of the display panel.

13. The bracket of claim 11, further comprising an outer plate on the edge portion of the first plate to be coupled to the display panel.

14. The bracket of claim 13, wherein a thickness of the outer plate is less than or equal to a distance from the edge portion of the first plate to an outer surface of the second plate.

15. The bracket of claim 13, wherein the outer plate contacts the first plate at an area corresponding to the non-display region of the display panel.

16. The bracket of claim 11, wherein the partitions comprise a honeycomb-like structure.

17. The bracket of claim 11, wherein the partitions have a wave-like structure.

18. The bracket of claim 11, wherein the second plate has a bent portion extended from an edge of the second plate toward the first plate and configured to make contact with the first plate.

19. The bracket of claim 11, wherein the display panel comprises an organic light emitting display (OLED) panel.

20. A display device comprising:

a display panel; and a bracket comprising:

a first plate contacting the display panel, wherein a first surface of the first plate is facing the display panel;

a second plate facing a second surface of the first plate opposite the first surface of the first plate, wherein the second plate has an area corresponding to a display area of the display panel that is smaller than an area of the first plate; and partitions between the first plate and the second plate, wherein the first plate has an edge surface extending beyond an outermost edge of the second plate.

\* \* \* \* \*